United States Patent [19]

Hatwar et al.

[11] Patent Number: 5,069,984
[45] Date of Patent: Dec. 3, 1991

[54] OVERWRITABLE MAGNETOOPTICAL RECORDING ELEMENT INCLUDING FIRST AND SECOND MAGNETIC LAYERS, WITH ONE OF WHICH CONTAINING ZIRCONIUM

[75] Inventors: Tukaram K. Hatwar; Anthony C. Palumbo, Jr., both of Rochester; Douglas G. Stinson, Fairport, all of N.Y.

[73] Assignee: Eastman Kodak Company, Rochester, N.Y.

[21] Appl. No.: 571,363

[22] Filed: Aug. 23, 1990

[51] Int. Cl.⁵ .............................................. G11B 11/00
[52] U.S. Cl. .................................. 428/694; 365/122; 369/288; 369/13
[58] Field of Search .................. 428/694, 900; 369/13, 369/288; 360/59, 114, 135; 365/122

[56] References Cited

U.S. PATENT DOCUMENTS 4,992,338  2/1991  Hatwar et al. ...................... 428/694

FOREIGN PATENT DOCUMENTS 0258978  3/1988  European Pat. Off. .
59-148160  8/1984  Japan .

OTHER PUBLICATIONS

Majumdar et al, "Effects of Pt and Zr on the Oxidation behavior of FeTbCo Magneto-Optic Felius: X-Ray Photoelectron Spectroscopy", J. Vac. Sci. tech. vol. A7(4), Jul./Aug. 1989, pp. 2673-2677.

Primary Examiner—Stuart S. Levy
Assistant Examiner—Hoa Nguyen
Attorney, Agent, or Firm—Warren W. Kurz

[57] ABSTRACT

A multilayer, direct-overwrite, magnetooptic recording element comprises first and second layers of magnetic materials having different magnetic coercivities and Curie temperatures. According to the invention, one of the two magnetic layers is doped with zirconium. The addition of zirconium has the effect of substantially lowering the Curie temperature of the doped layer, thereby enlarging the Curie temperature differential between the magnetic layers. The zirconium additive also has the effect of stabilizing the magnetic properties of the doped layer.

6 Claims, 5 Drawing Sheets 5,069,984

OVERWRITABLE MAGNETOOPTICAL RECORDING ELEMENT INCLUDING FIRST AND SECOND MAGNETIC LAYERS, WITH ONE OF WHICH CONTAINING ZIRCONIUM

BACKGROUND OF THE INVENTION

The present invention relates to the field of magneto-optic recording. More particularly, it relates to improvements in magneto-optic recording elements of the type having a direct-overwrite capability.

Conventional magneto-optic disks require two revolutions of the disk to record information. The first revolution is used to erase any previously recorded information, while the second revolution is used to record the new information. The information is stored as patterns of vertically oriented magnetic domains arranged along an annular track on the magneto-optic disk. Traditional magnetic recording systems have a direct-overwrite capability in that erasure of previously recorded information is intrinsic in the recording process. Hence, magnetic systems require only one revolution to record data. As a consequence, compared to magnetic disks, magneto-optic disks are disadvantageous from the standpoint of requiring a substantially longer effective access time.

In U.S. Pat. No. 4,855,975 to Saito et al, a magneto-optic recording system is described which eliminates the noted two-revolution requirement. Here, the recording element comprises two different magnetic layers or films laminated together. One layer, the reference layer, has a low room-temperature coercivity $H_{c(ref.)}$ and a high Curie temperature $T_{c(ref.)}$. The other layer, the so-called memory layer, has a high room-temperature coercivity $H_{c(mem.)}$ and a low Curie temperature $T_{c(mem.)}$. As the disk-shaped recording element rotates, the disk passes in close proximity to an initialization magnet, thereby exposing the disk to a field $-H_i$ perpendicular to the disk surface, where $H_{c(mem.)} > H_i > H_{c(ref.)}$. This initialization field serves to vertically orient all magnetic domains of the reference layer in a given direction (e.g. "down") but has no effect on the memory layer. A second magnet, the bias magnet, is arranged to expose the area of the disk which is selectively heated by an intensity-modulated laser to a field $H_b$, where $H_{c(mem.)} > H_{c(ref.)} > H_b$. The bias field $H_b$ is perpendicular to the disk and directed in the direction opposite to that of $-H_i$. While the disk is being read, $H_b$ has no effect on either layer.

When the above-described disk is exposed to a certain power of laser light, the memory layer will be heated above its Curie temperature, while the reference layer remains below its Curie temperature. Under these conditions, the magnetic exchange interaction which exists between the two layers will cause the magnetization of the memory layer to be aligned with the magnetization of the reference layer. Whenever the disk is selectively exposed to a higher light power, both layers become heated to temperatures above their respective Curie temperatures, and the magnetization of the heated portions of both layers become realigned in the direction of the bias field $H_b$, i.e., the field produced by the bias magnet. Consequently, by modulating the laser light intensity between these two power levels, digital information can be recorded while simultaneously erasing any pre-existing information.

Successful direct overwriting using the above-described recording element requires a substantial Curie temperature differential (e.g. at least 50°) between the two magnetic layers, as well as a substantial difference in magnetic coercivity (e.g. at least 5000 Oersteds). Such temperature and coercivity differentials have been achieved in the prior art recording elements by either using entirely different magnetic materials as the memory and reference layers (e.g. by using a GdDy alloy as the memory layer and a GdTb alloy as the reference layer) and by adjusting the stoichiometry of the same elements used in both layers (e.g., by varying the concentrations of terbium and iron in a TbFeCo layer). While the requisite coercivity differential can be readily achieved by these techniques it has been difficult to achieve a Curie temperature differential substantially greater than about 70° C.

SUMMARY OF THE INVENTION

In view of the foregoing, an object of the invention is to provide a readily manufacturable multilayer direct-overwrite-type magneto-optic recording element in which two different terbium-iron-cobalt layers exhibit a Curie temperature differential of at least 70° C.

According to the invention, one of two separate terbium-iron-cobalt layers comprising a multilayer, direct-overwrite, magneto-optic recording element is doped with zirconium in an amount of between 5 and 15 atomic percent (at. %). According to a preferred embodiment, one such layer exhibits a stoichiometry of $Tb_aFe_bCo_c$, where $15 < a < 30$ at. %, $50 < b < 70$ at. %, and $5 < c < 25$ at. %; whereas the other layer exhibits a stoichiometry of $(Tb_dFe_{e-x}Co_c)_{100-x}Zr_x$, where $15 < d < 30$ at. %, $50 < e < 70$ at. %, $5 < x < 15$ at%.

An advantageous technical effect of the multilayer, direct-overwrite magneto-optic recording element of the invention is that it is useful in recording systems in which the write laser power varies substantially (e.g. due to optical feedback) from a nominal value.

The invention and its advantages will become more apparent to those skilled in the art from the ensuing detailed description of preferred embodiments, reference being made to the accompanying drawings, wherein like reference characters denote like parts.

DETAILED DESCRIPTION OF THE PREFERRED EMBODIMENTS

This invention is based in part, on the observation that the Curie temperature of a terbium-iron-cobalt layer can be dramatically lowered by doping the layer with zirconium in an amount of between 5 and 15 at. %. In addition to lowering the Curie temperature of the layer which, of course, increases the recording sensitivity of the layer, the zirconium also provides an advantageous effect of enhancing the corrosion and oxidation resistance of the layer. The latter advantages are disclosed in the commonly-assigned U.S. patent application Ser. No. 435,915 filed in the name of T. K. Hatwar on Nov. 13, 1989 and entitled "MAGNETOOPTICAL RECORDING ELEMENT". While the zirconium doping has an adverse effect on the Kerr rotation angle (see FIG. 6), it has been found that the Kerr rotation angle can be maintained above an acceptable value (about 1 degree) if the zirconium concentration is less than 15% at. %, and more preferably less than 10% at. %.

Figure 1:
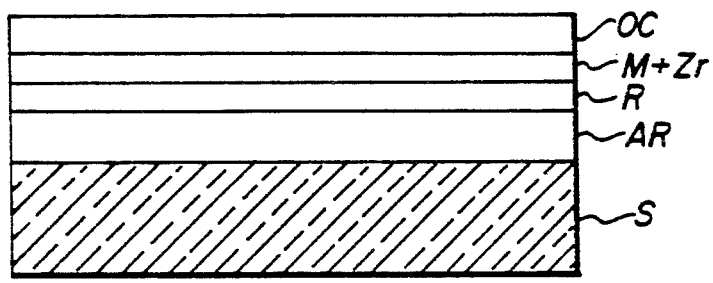
FIGS. 1–3 are schematic cross-sectional illustrations of a multilayer direct-overwrite magneto-optic recording element embodying the present invention.
Figure 2:
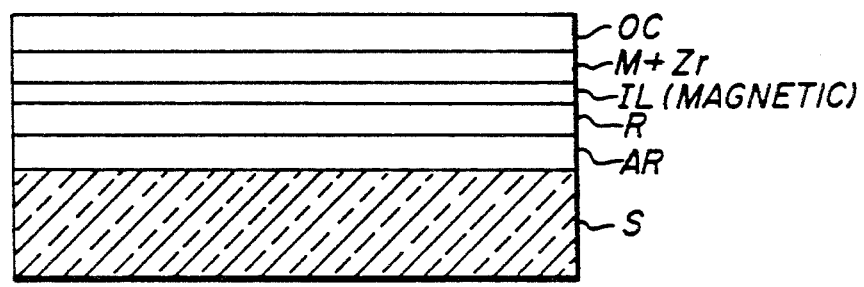
Figure 3:
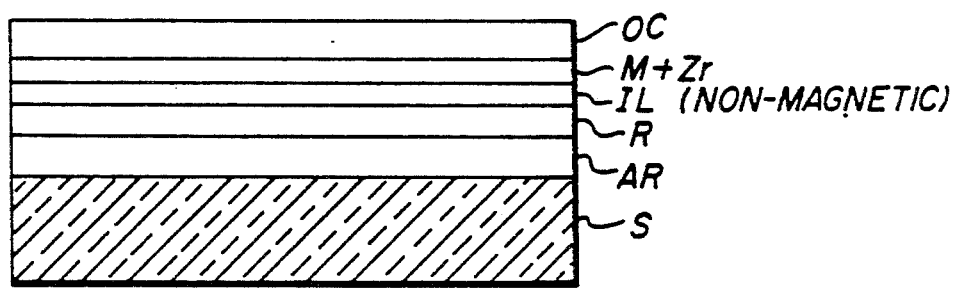

Referring to the drawings, FIGS. 1–3 illustrate three different magneto-optic recording elements embodying the invention. All are of the multilayer, direct overwrite variety, comprising a relatively thick transparent substrate S having an antireflection coating AR (e.g. a thin-film of aluminum-nitride) disposed on one of its planar surfaces. Each recording element comprises first and second magnetic recording layers, denoted as a memory layer M and a reference layer R. Both magnetic layers comprise a terbium-iron-cobalt alloy with preferred stoichiometries being described below. Atop the magnetic memory layer is a protective overcoat OC, such as a thin film (e.g. 1100 Angstroms) of aluminum nitride. In the FIG. 1 embodiment, magnetic layers M and R are continguous, whereas in the embodiments of FIGS. 2 and 3, an intermediate layer IL is provided to control the magnetic exchange interaction between the magnetic layers. In FIG. 2, such intermediate layer comprises a magnetic material, whereas in FIG. 3, the intermediate layer comprises a readily polarizable non-magnetic material such as palladium, as disclosed in the commonly assigned U.S. application Ser. No. 488,166 filed on Mar. 5, 1990 in the name of T. K. Hatwar et al. entitled MAGNETO-OPTIC RECORDING ELEMENT WITH POLARIZABLE METAL INTERLACE.

Figure 4:
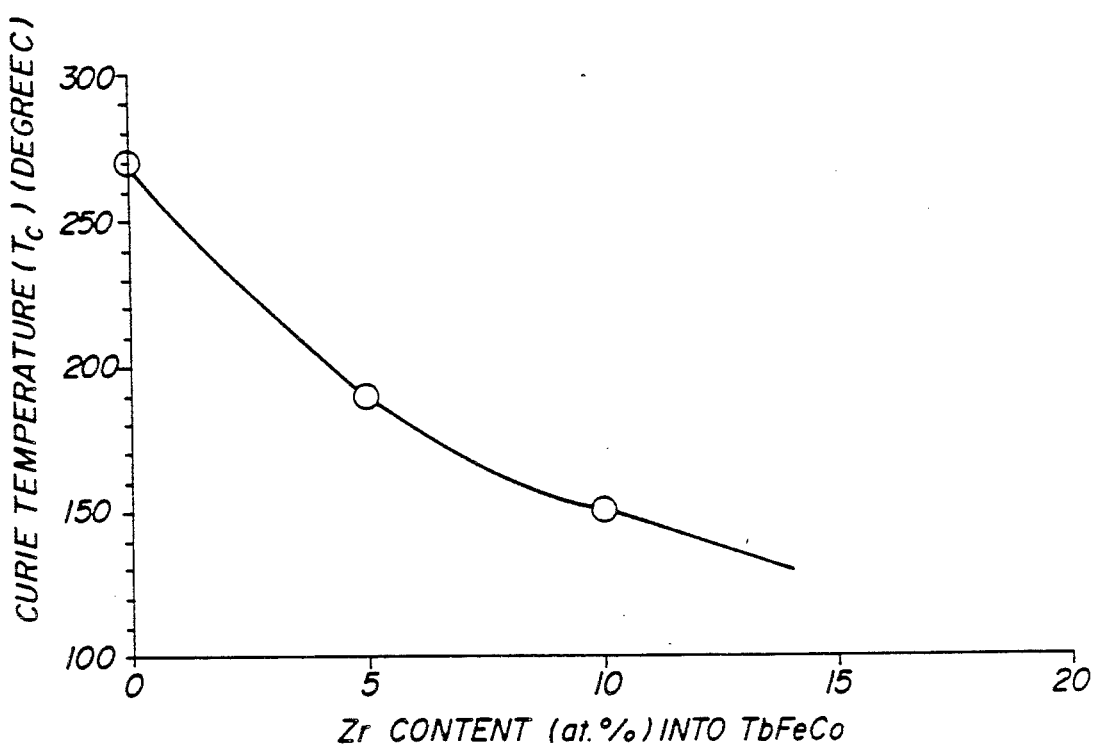
FIGS. 4–6 are graphs illustrating the changes in Curie temperature, recording power and Kerr rotation angle, respectively, with increasing concentration of zirconium in a terbium-iron-cobalt magnetic layer.
Figure 5:
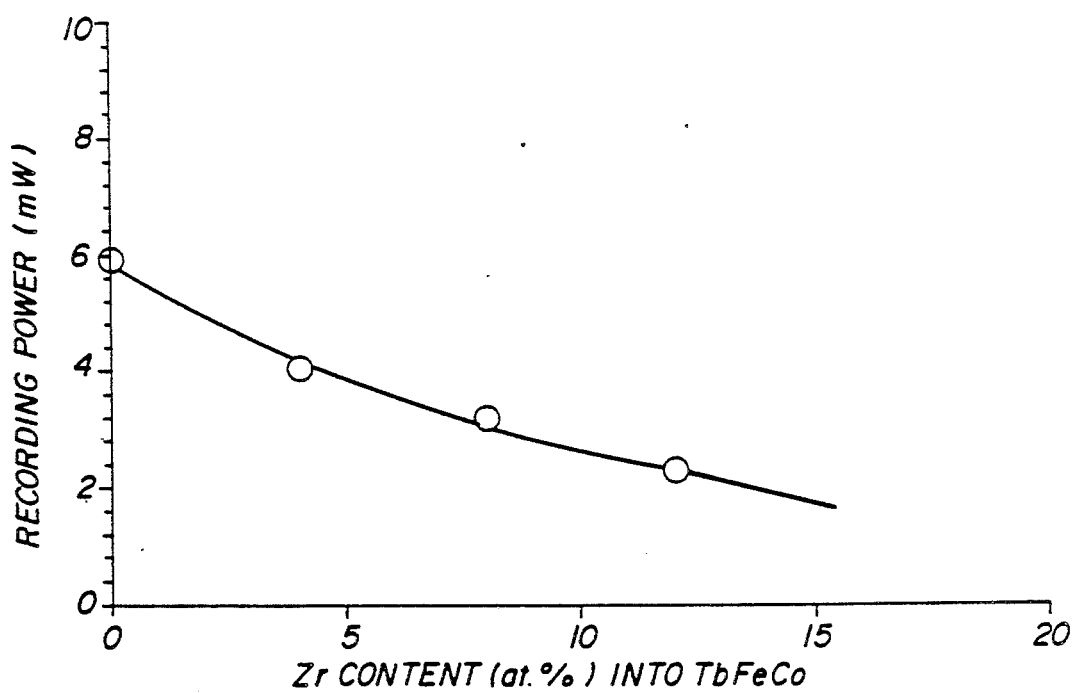
Figure 6:
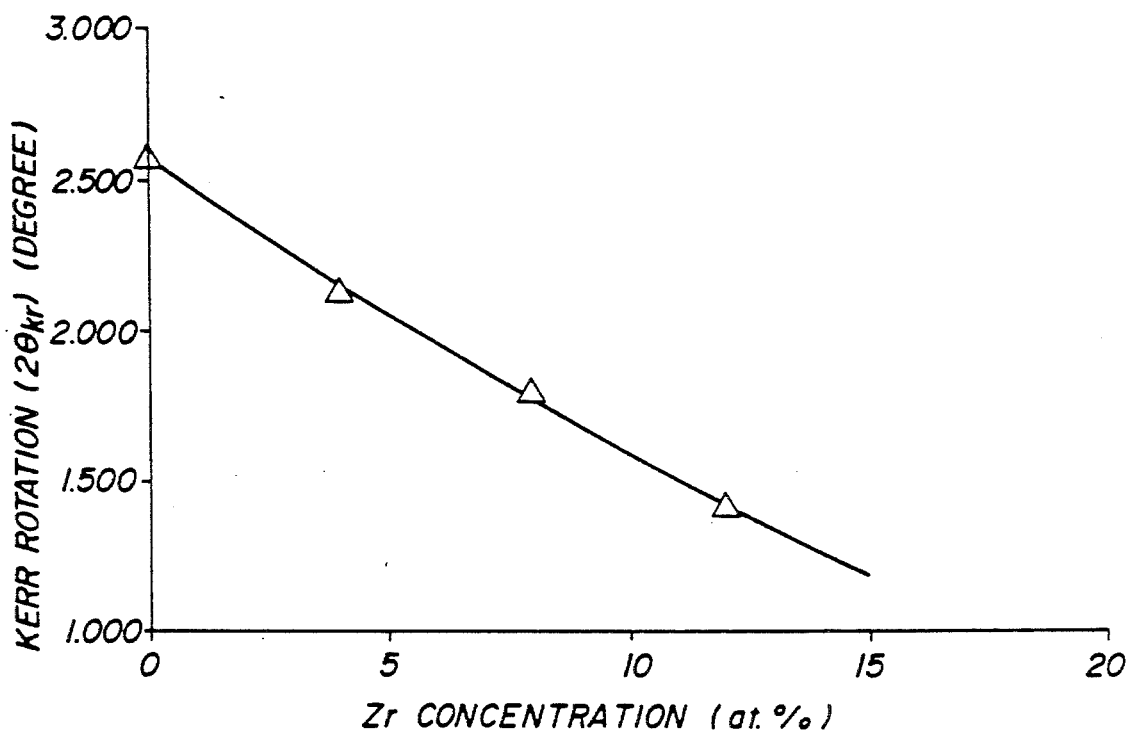

In accordance with the invention, the memory layer M of the recording elements shown in FIGS. 1–3 is doped with zirconium for the purpose of lowering its Curie temperature vis-a-vis the reference layer R. the effect of the zirconium doping on Curie temperature is illustrated in the graph of FIG. 4. As shown, the Curie temperature of the non-doped layer is approximately 270° C. As the concentration of zirconium increases to 15 atomic percent, the Curie temperature drops to about 130° C. In FIG. 5, the effect of the zirconium doping on recording power is shown. Again, adding zirconium has the effect of increasing the sensitivity of the magnetic layer up to a zirconium concentration of about 15 at. %. This increase in sensitivity, of course, may be expected from the FIG. 4 curve. In FIG. 6, however, it is apparent that the zirconium additive has an adverse effect on the Kerr rotation angle $\Theta_k$. While a useful Kerr rotation is still attained as the zirconium doping is increased to 15%, it is highly preferred that the zirconium concentration be limited to less than 10 at. %. To achieve the desired Curie temperature-lowering effect, it is preferred that the zirconium concentration be no less than 5%. In other words, it is preferred that layer M satisfy the formula:

$$TbFeCo_{(1-x)}Zr_x$$

where $5\% < x < 10\%$

To provide the necessary differentials in the magnetic coercivity and Curie temperature between layers M and R, it is preferred that the reference layer R have a stoichiometry of $Tb_aFe_bCo_c$, where $15 < a < 30$ at. %, $50 < b < 70$ at. %, and $5 < c < 25$ at. %; and that the memory layer have a stoichiometry of $(Tb_dFe_eCo_c)_{100-x}Zr_x$, where $15 < d < 30$ at. %, $50 < e < 70$ at. %, and $5 < x < 15$ at. %. A particularly preferred stoichiometry of the reference and memory layers is one in which the reference layer has a stoichiometry of $Tb_{20}Fe_{70}Co_{10}$, whereas the memory layer M has, depending on the zirconium concentration, a stoichiometry of $Tb_{24}Fe_{66-x}Co_{10}Zr_x$. This gives rise to the following stoichiometries:

$Tb_{24}Fe_{61}Co_{10}Zr_5$
$Tb_{24}Fe_{56}Co_{10}Zr_{10}$
$Tb_{24}Fe_{51}Co_{10}Zr_{15}$

Figure 7:
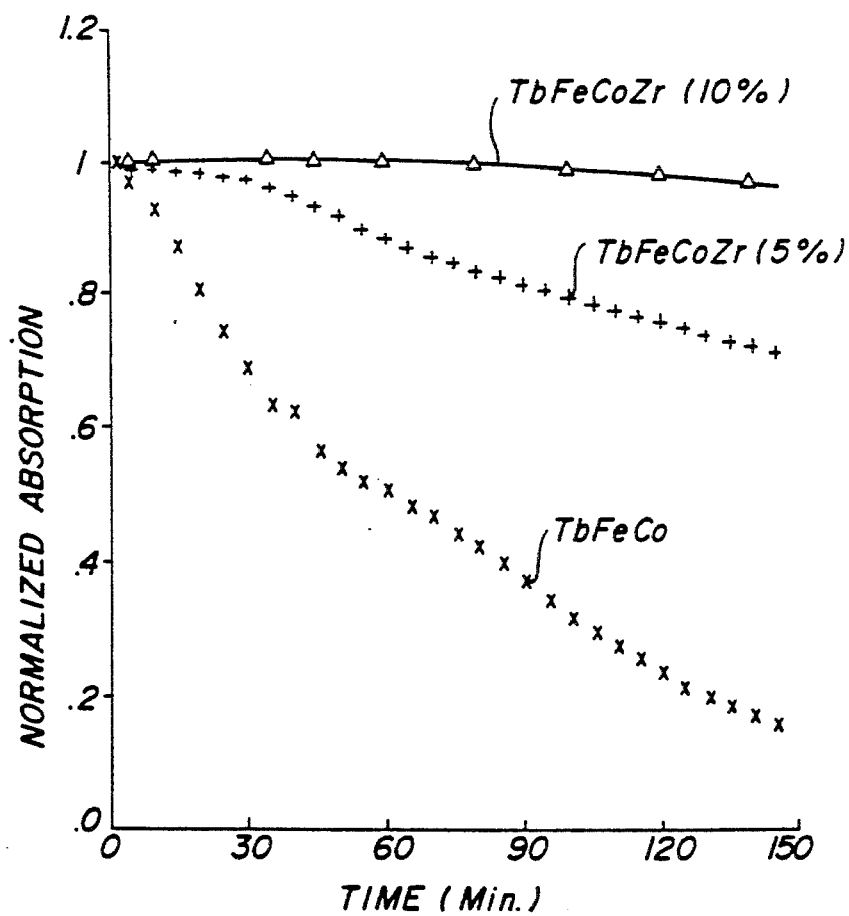
FIGS. 7 and 8 are graphs respectively illustrating the effect on corrosion and oxidation resistance of a terbium-iron-cobalt layer with increasing concentrations of zirconium.
Figure 8:
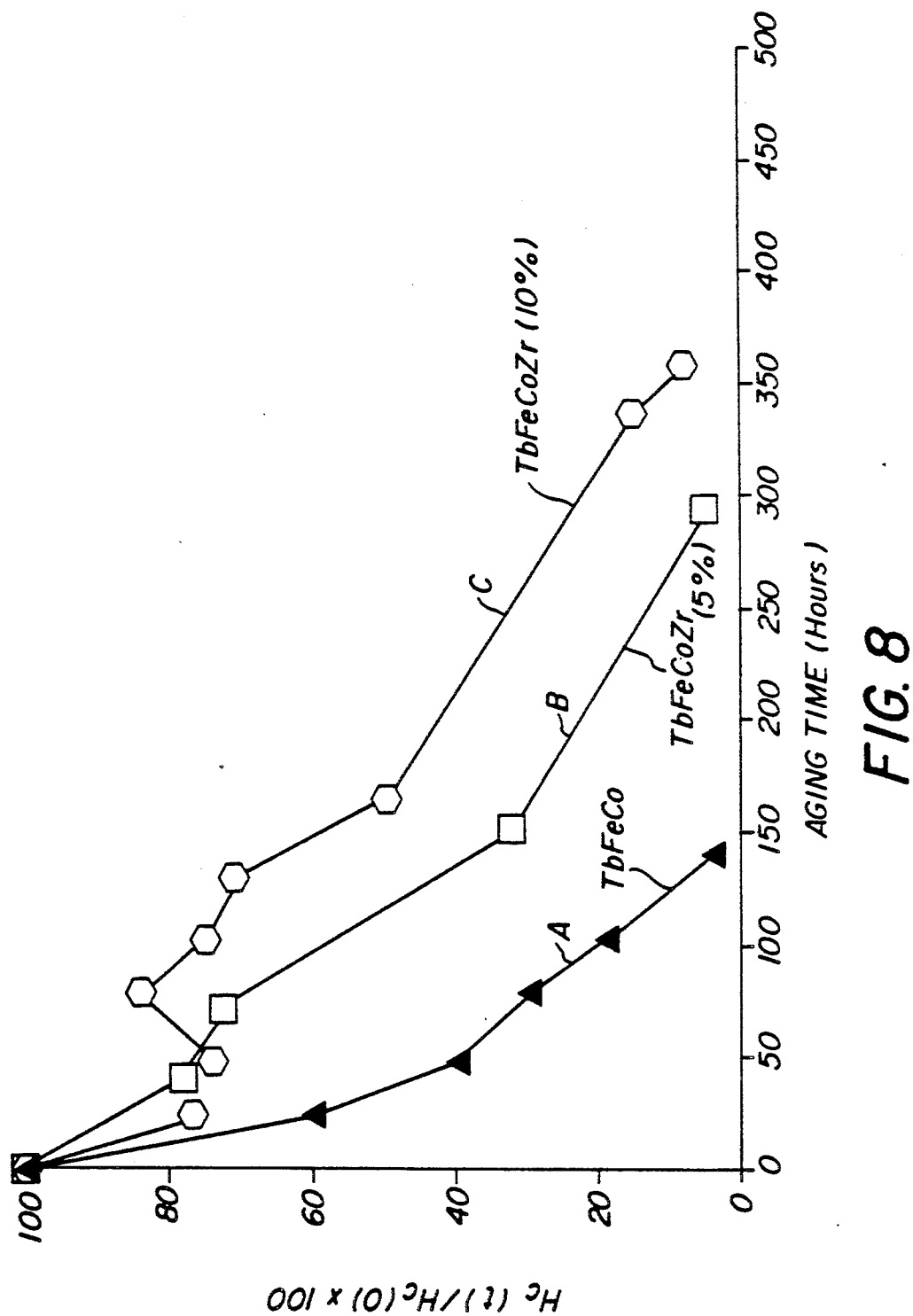

In addition to providing a Curie temperature differential of at least 130° C. (when the zirconium doping is at least 5%), the zirconium has a positive effect on corrosion and oxidation prevention. In FIG. 7, the effect of zirconium doping on corrosion prevention is illustrated for dopings of 0,5 and 10 at. %. Here, a substrate bearing a 1200 Angstroms thick doped layer is immersed in a solution of 0.005 Molar KCl/chloracetate. The light absorption of the layer was then measured at various times for 150 minutes. As shown, when the zirconium doping increases to 10 at. %, the light absorption remains relatively constant, indicating that there is relatively little "pitting" occurring in the layer as a result of the immersion. In FIG. 8, curves A, B and C show how the coercivity changes as a function of time and zirconium doping in an accelerated aging test at 70° C. and 30% relative humidity. A fast decrease in the coercivity was observed for TbFeCo film, and the MO properties were completely lost within 150 hours of aging. Both $(TbFeCo)_{95}$-$Zr_5$ and $(TbFeCo)_{90}$-$Zr_{10}$ films survived for longer periods indicating that oxidation resistance improved with the addition of Zr.

Example

A direct-overwrite magneto-optic recording element of the type shown in FIG. 3 was made using standard sputtering techniques with four separate planar sputtering targets, viz, targets made of (a) aluminum (b) $Tb_{24}Fe_{56}Co_{10}Zr_{10}$ (memory layer); (c) $Tb_{20}Fe_{70}Co_{10}$ (reference layer); and (d) palladium (intermediate layer). An aluminum-nitride antireflection layer, 1100 Angstroms thick, was produced on a glass substrate by a reactive sputtering process in an argon and nitrogen atmosphere. Thereafter, the reference, intermediate and memory layers were sequentially sputtered in an argon environment. The reference layer was 500 Angstroms thick, the palladium layer 20 Angstroms thick, and the memory layer 650 Angstroms thick. Finally, a protective overcoat, 1100 Angstroms thick, was reactively sputtered on top of the memory layer. The resulting recording element was used in a direct overwrite, magneto-optic recording process.

Figure 9:
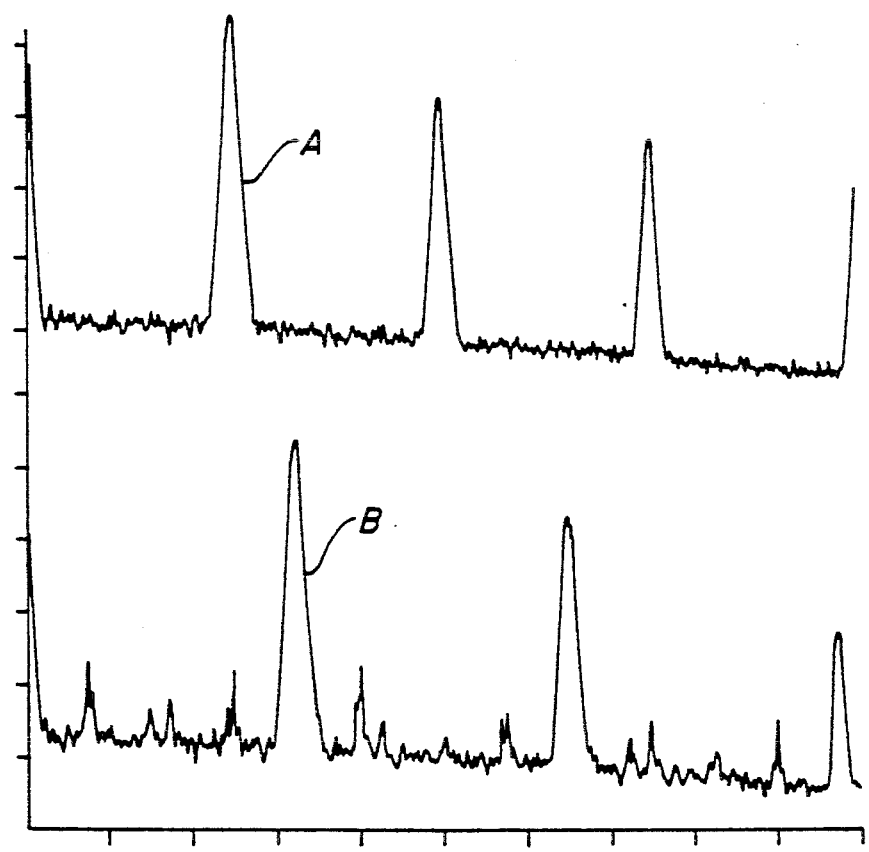
FIG. 9 presents spectrum analyses illustrating the direct-overwrite capability of the magneto-optic recording element of the invention.

The initialization field, $H_i$, was 7000 Oersteds, the bias field, $H_b$, was 100 Oersteds, and a writing laser was modulated in intensity between 4.9 and 10.0 milliwatts. A track was written while frequency-modulation the laser at 1 MHz. The spectrum of the recovered signal is shown in curve A of FIG. 9. This curve shows a peak at 1.0 MHz and several harmonics, as expected. The same track was then overwritten while modulating the laser at 1.30 MHz. The spectrum of the recovered signal is shown in curve B of FIG. 9. The expected peaks at 1.30 MHz and harmonics are observed, with the former peaks at 1.0 MHz being absent. This illustrates that direct-overwrite has occurred.

The invention has been described in detail with particular reference to certain preferred embodiments thereof, but it will be understood that variations and modifications can be effected within the spirit and scope of the invention.

What is claimed is:

1. A direct-overwrite magneto-optic recording element comprising a substrate supporting first and second layers of terbium-iron-cobalt, one of said layers being doped with zirconium in an amount between about 5 and 15 atomic percent.

2. The recording element as defined by claim 1 wherein said first and second layers are spaced apart by a layer of palladium.

3. A direct-overwrite magneto-optic recording element comprising a substrate bearing first and second layers comprising a terbium-iron-cobalt alloy, one of said layers being doped with zirconium and having a stoichiometry of $Tb_{25}Fe_{66-x}Co_{10}Zr_x$, where x is between 5 and 15 atomic percent.

4. The recording element as defined by claim 3 wherein the other of said layers has a stoichiometry of $Tb_{20}Fe_{70}Co_{10}$.

5. The recording element as defined by claim 4 wherein said first and second layers are spaced apart by a layer of palladium.

6. A direct-overwrite magneto-optic recording element comprising a substrate bearing first and second layers comprising a terbium-iron-cobalt alloy, one of said layers having a stoichiometry of $Tb_aFe_bCo_c$, where $15<a<30$ at. %, $50<b<70$ at. %, and $5<c<25$ at. %, and the other of said layers being doped with zirconium and having a stoichiometry of $(Tb_dFe_eCo_c)_{100-x}Zr_x$, where $15<d<30$ at. %, $50<e<70$ at. %, and $5<x<15$ at. %.

* * * * *